March 1, 1966    C. C. CLARK    3,237,532
PISTON MANUFACTURE
Filed Dec. 11, 1963    4 Sheets-Sheet 1
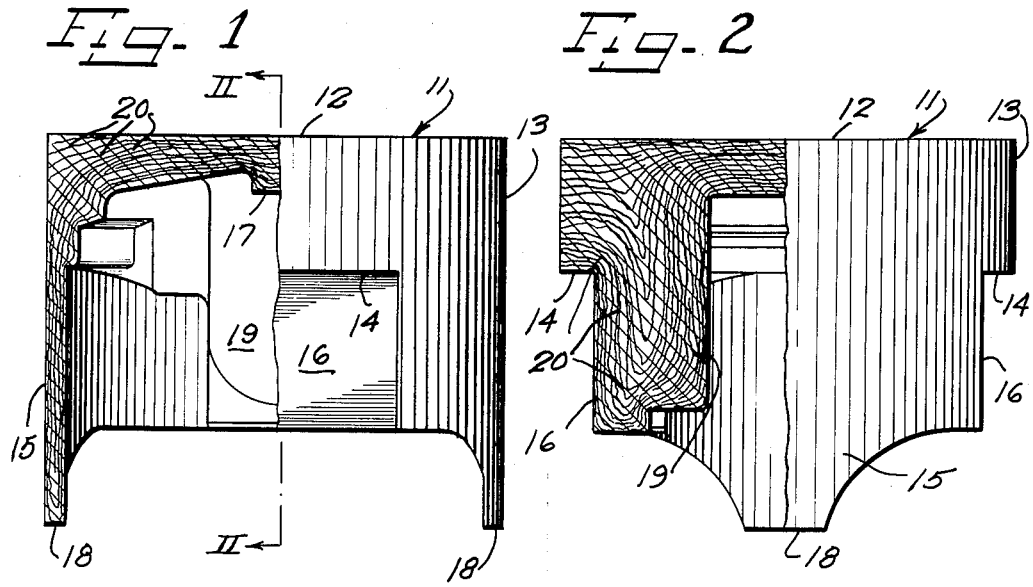
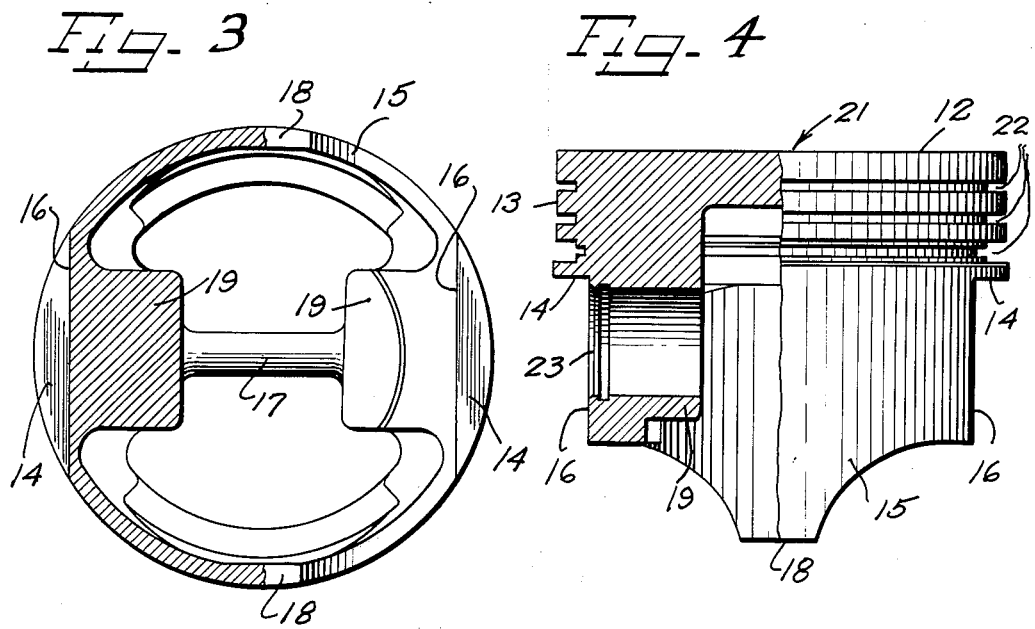
INVENTOR.
CLYDE C. CLARK
BY
ATTORNEYS March 1, 1966     C. C. CLARK     3,237,532

PISTON MANUFACTURE

Filed Dec. 11, 1963     4 Sheets-Sheet 2

INVENTOR.
CLYDE C. CLARK
BY
ATTORNEYS

March 1, 1966 C. C. CLARK 3,237,532
PISTON MANUFACTURE
Filed Dec. 11, 1963 4 Sheets-Sheet 3
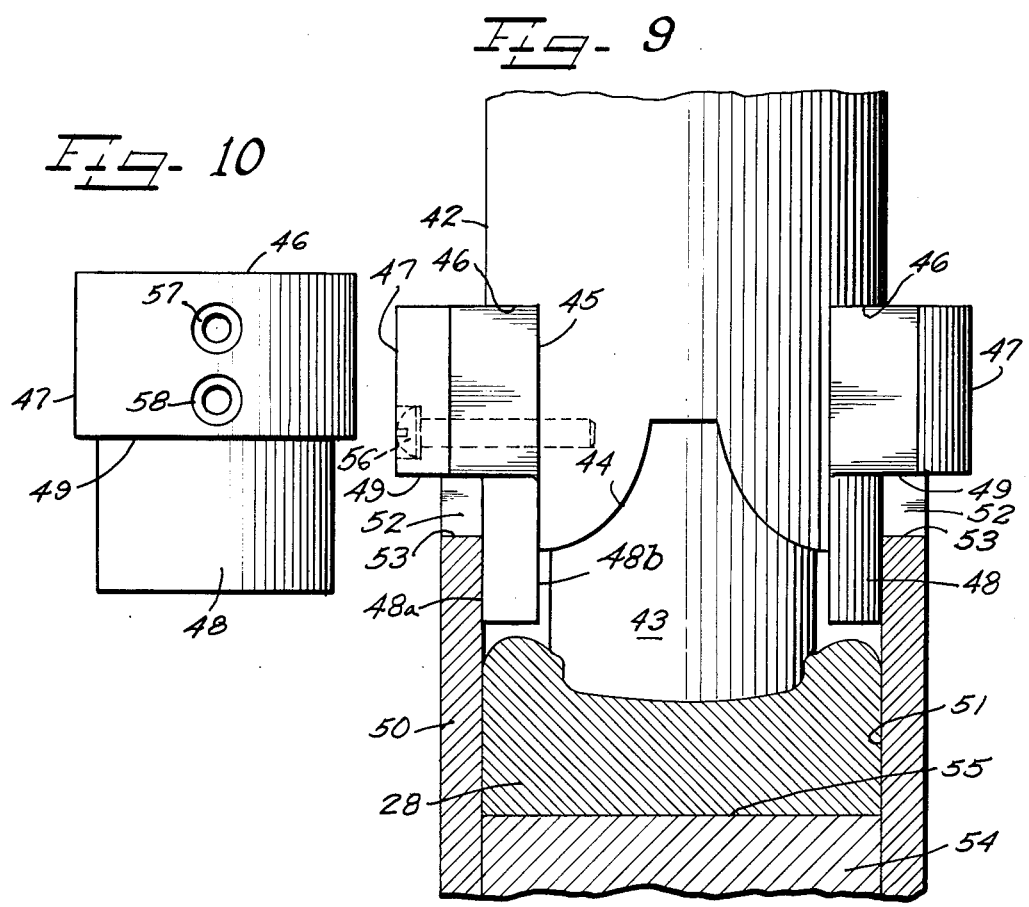
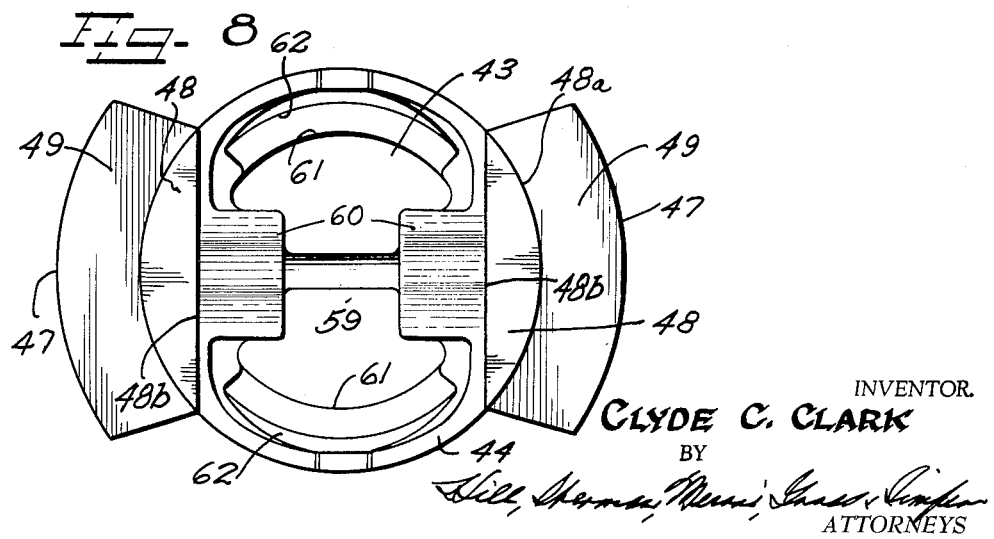
INVENTOR.
CLYDE C. CLARK
BY
ATTORNEYS March 1, 1966 C. C. CLARK 3,237,532
PISTON MANUFACTURE
Filed Dec. 11, 1963 4 Sheets-Sheet 4
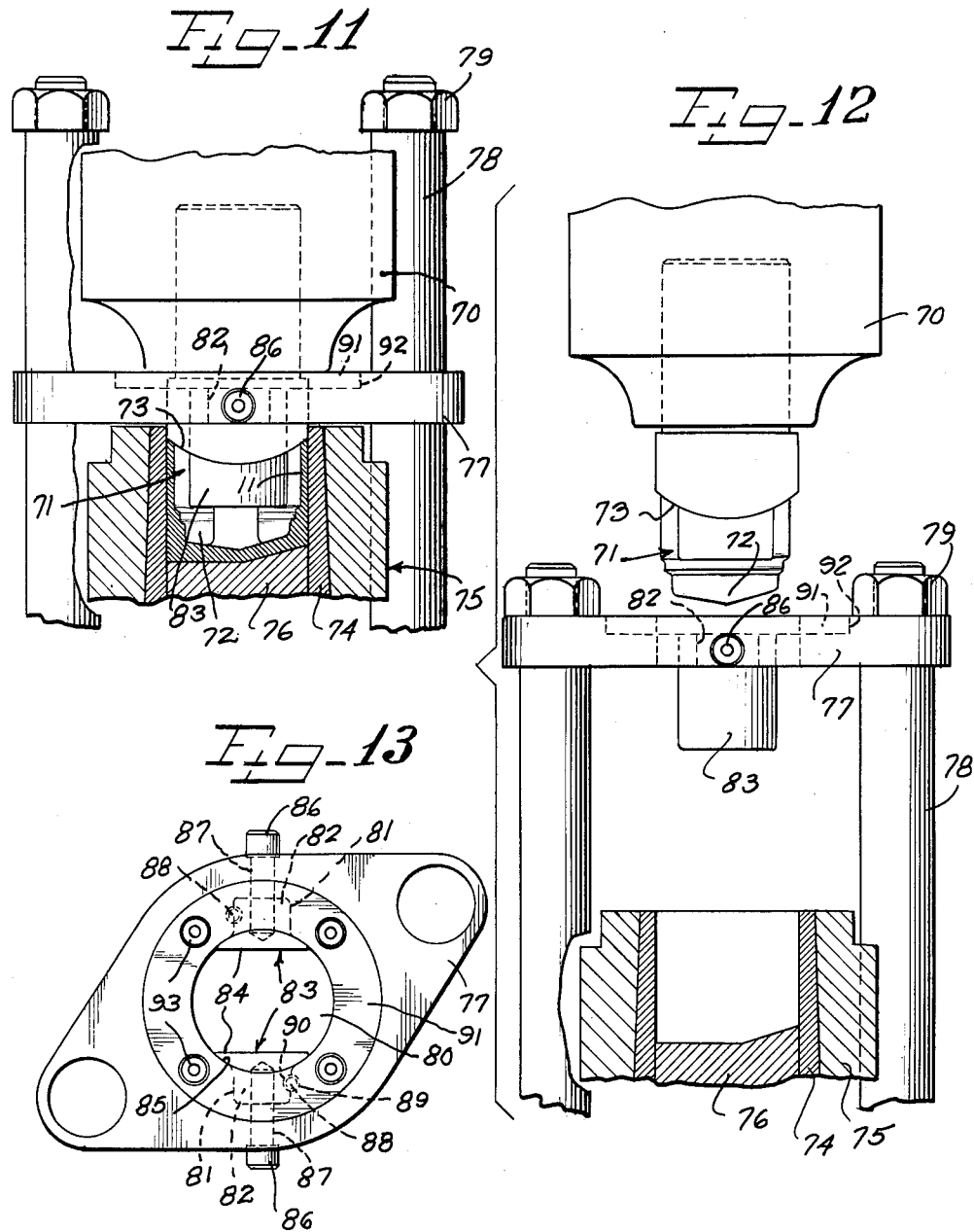
INVENTOR.
CLYDE C. CLARK
BY
ATTORNEYS United States Patent Office 3,237,532
Patented Mar. 1, 1966

3,237,532
PISTON MANUFACTURE
Clyde C. Clark, Euclid, Ohio, assignor to
TRW Inc., a corporation of Ohio
Filed Dec. 11, 1963, Ser. No. 329,788
12 Claims. (Cl. 92—222)

This invention relates to the production of cup-shaped metal articles with indented side wall areas formed by extrusion in an impact forging operation which develops improved metal grain flow formations not heretofore available. Specifically this invention relates to the production of impact forged aluminum slipper type internal combustion engine pistons with indented flattened skirt portions at the wrist pin axis having a grain flow line structure providing improved strength and wear characteristics.

The invention will hereinafter be specifically described as embodied in an aluminum slipper piston for internal combustion engines which has relieved skirt areas or flats at the pin boss locations but it should be understood that the principles of this invention are generally applicable to the production of cylindrical cup-shaped members with indented side wall areas which could not heretofore be produced by extrusion or impact forging operations exclusive of metal cutting operations.

Slipper type pistons with indented flats at the wrist pin axis have heretofore been produced only by casting or machining operations. The cast pistons do not have a worked grain flow structure and lack the lightweight and strength required for modern engines. The machining of flats on forged pistons involves cutting across grain flow lines and produces a weakened construction. The present invention now provides forged pistons with flats and indentations where desired and develops the strongest possible grain flow pattern. The grain flow pattern in pistons produced by this invention is parallel to the surfaces of the piston head, the skirt, the pin bosses, and the shoulders between the head and indented flats at the wrist pin axis. Thus these surfaces are defined by the sides of the grain flow lines. In general, the grain flow lines in the head and ring band area of the piston extend transversely to the piston axis and bow downwardly into the pin bosses. Since the tensile strength of forged articles is greater in the direction of grain flow than across the grain flow direction, the grain flow pattern adjacent the flats and in the wrist pin bosses materially increases the tensile strength in this load transmitting area of the piston. Further, since the head of the piston and the side walls of the skirt between the flattened skirt portions are defined only by the sides of the metal grain flow lines they will have improved wear characteristics.

The preliminary steps in the forging process used to produce pistons in accordance with this invention are more fully described in the Townhill U.S. Patent No. 3,010,186, and include the steps of individually casting aluminum slugs or cutting them from a cast rod and heating them to forging temperatures of about 750 to 950° F. These slugs are then subjected to endwise impact for kneading the cast crystalline structure of the metal for initiating a grain flow line configuration which can be extruded without tearing the metal. This initial treatment increases the diameter and decreases the length of a slug to produce a solid cylindrical billet preferably having a domed top. The thus formed billet is then subjected to impact extrusion in a die by a punch which is shaped to form the hollow interior of the piston. In accordance with this invention, however, the punch is provided with a pair of inserts rigidly mounted adjacent the boss-forming portions thereof which are shaped to flatten the skirt portion of the piston blank adjacent the bosses. These inserts can be made as separate pieces to facilitate the manufacture of the tool or, if desired, can be integral with the punch. Alternately the inserts can be mounted on a stripper plate through which the punch projects.

Pistons produced in accordance with this invention have flattened skirt portions and a grain flow pattern that extends across the head and parallel to the inner and outer walls of the circular portions of the skirt, and which is also normal to the outer surface of the ring belt area, and conforms to the interior and exterior surfaces in the region that includes the pin bosses and flattened skirt areas outboard of the pin bosses and below the ring belt area. Accordingly, pistons produced in accordance with this novel method have greater strength than pistons of the same configuration machined from cylindrical forgings.

It is therefore an object of the present invention to provide a cup-shaped impact forged metal article having a head and a side wall with indented portions underlying the head and a grain flow pattern which improves the strength of the article.

Another object of the invention is to provide an improved forged piston having both circular and flattened skirt portions whose surfaces are defined by the sides of metal grain bands.

A further object of the invention is to provide a method of making an extruded metal pin boss equipped slipper piston having a skirt with indented flattened faces at the pin bosses.

A further object of the present invention is to provide a method of making an extruded piston having a flat faced skirt and a grain flow pattern which was heretofore unable to be produced.

A still further object of the present invention is to provide a method of making an improved impact forged piston and simultaneously forming a pair of flats on the skirt thereof.

A still further object of the present invention is to provide an apparatus for impact forging pistons having non-circular skirts.

Other and further objects of the present invention will be apparent to those skilled in this art from the following detailed description of the annexed sheets of drawings illustrating preferred embodiments of the present invention wherein like reference numerals and characters refer to like and corresponding parts throughout the several views.

On the drawings:

FIGURE 1 is a side elevational view, partly in section, of a slipper type piston blank formed according to this invention and showing the grain flow line formation of the blank.

FIGURE 2 is a view similar to FIG. 1 but taken along the line II—II of FIG. 1.

FIGURE 3 is a bottom plan view, partly in section, of a finished piston made from the blank of FIGS. 1 and 2.

FIGURE 4 is an elevational view, partly in section, of the finished piston shown in FIG. 3.

FIGURE 5 is a plan view of the nose of the punch in the die of the present invention.

FIGURE 6 is a fragmentary vertical sectional view of a die with a billet positioned therein and a punch, with the punch shown partly in section and elevation.

FIGURE 7 is an elevational view of the flat sidewall forming insert of the present invention.

FIGURE 8 is a plan view of the punch and die of another embodiment of the present invention.

FIGURE 9 is a fragmentary vertical sectional view of the die and punch shown in FIG. 8 with the punch shown in elevation and contacting a billet positioned within the die cavity.

FIGURE 10 is an elevational view of the flat sidewall forming insert shown in the embodiment of the present invention illustrated in FIGS. 8 and 9.

FIGURE 11 is a fragmentary vertical sectional view of a stripper plate equipped die and punch assembly in closed position with a formed billet therein and with parts in elevation.

FIGURE 12 is a view similar to FIG. 11 but showing the assembly in opened position to illustrate the separation of the billet from the punch by the stripper plate.

FIGURE 13 is a plan view of the stripper plate of FIGS. 11 and 12.

As shown on the drawings:

In FIGS. 1 to 3 the reference numeral 11 designates an extruded or impact forged piston of the present invention. The piston 11 has a head 12, a circular ring belt wall area 13 depending from the head to a pair of opposed undercut shoulders 14 and a cylindrical skirt 15 between the shoulders. The skirt 15 has flat sidewall portions or flats 16 under the shoulders. A strut rib 17 is formed across the underface of the head and the skirt is scalloped to extend to a pair of elongated tails 18, 90° from the flats 16. Thickened wrist pin boss sections 19 extend from the head 12 inside the belt wall 13 and the flat 16. These pin boss sections 19 are thicker than the skirt and ring belt wall and extend from the head to just above the short bottom areas of the scalloped skirt 15.

As shown, the extruded piston 11 has grain flow lines 20 extending continuously across the top of the head and parallel to the inner and outer walls of the circular portion of the skirt and normal to the outer surface of the ring belt area and conforming to the interior and exterior surfaces in the region that includes the pin bosses and flat sidewall portions 16. This grain flow pattern is developed in the piston by means of the impact extrusion process of the present invention and is transverse to the direction of the principal load in all areas so that the major tensile stresses are parallel to the direction of the grain flow resulting in a piston with greater strength than a piston of the same configuration machined from a cylindrical forging.

The blanks 11 of FIGS. 1, 2 and 3 need not be machined or ground on the inside thereon to produce the finished piston 21 of FIG. 4. The blanks are finished externally by cutting the piston ring grooves 22 in the ring belt wall 13 thereof, by drilling the wrist pin holes 23 in the pin bosses 19 thereof, by finish grinding the outside diameter, by machining the top of the head, and in some instances, by slotting the skirt for size control.

The piston blank 11 is formed from a billet (not shown) which can be produced by the method described in the Townhill Patent No. 3,010,186. Briefly this method includes the cutting of a slug approximately five inches in length from a cast aluminum rod approximately three inches in diameter. Due to the cast crystalline structure the slug will be relatively free from grain flow lines however, upon subjecting the slug to endwise impacting a grain flow line configuration is developed which enables the metal to be extruded without any tearing thereof. This initial treatment increases the diameter and decreases the length of the slug to produce a solid cylindrical billet preferably having a domed top.

In FIG. 6, the impact forging apparatus for producing the piston blank 11 is illustrated. This apparatus includes a punch 25 operating in a die 26 having a cavity 27 in which is seated a partially shaped metal billet 28. The die has a bottom member 29 with an upper face 30 receiving the bottom face 31 of the billet 28. The original diameter of the billet is such that it will fit freely in the die cavity 27. The bottom member 29 is movable in the die cavity for ejecting the extruded piston from the cavity.

The nose of the punch 25 is shaped to finish form the inside of the piston and has a rib forming cavity 25a, pin boss forming cavities 25b, skirt shaping walls 25c and scalloped end shoulders 25d for shaping the end of the skirt 15.

In accordance with this invention, the punch 25 is equipped with diametrically opposed flat sidewall forming elements or inserts 32 having fragmental cylindrical outer walls 32a for slidably engaging the walls of the die cavity 27 and flat inner faces 32b for forming the flats 16. These inserts 32 are fixedly mounted to the sides of the punch and project beyond the punch shoulders 25d to present the flat faces 32d thereof in spaced parallel relation outwardly from the pin boss forming cavities 25b of the punch nose. The bottom ends of the inserts 32 have flat end walls 32c to form the shoulders 14 under the ring band 13. Thus, as shown in FIG. 6, there is provided in the die cavity 27 under the end heads 32c an annular space 33 between the die cavity wall and the punch nose for forming the ring band area and the upper end of the pin boss section of the piston. Then this space 33 decreases in width to provide the narrow spaces 34 opposite the flat faces 32b of the inserts for forming the flat face sections of the skirt.

The inserts 32 can be made separately from the punch 25 and are provided with a pair of countersunk holes 35 and 36 to receive fastening screws and a pair of dowel pin receiving holes 37 and 38. The sides of the punch 25 have recesses 39 for receiving the upper ends of the inserts 32. Dowels 40 carried by the punch project into these recesses through the holes 37 and 38 and screws 41 bottomed in the countersunk holes 35 and 36 are threaded into the sides of the punch for securing the inserts in position. Obviously of course any other suitable attachment means can be used to unite the inserts to the punch and if desired the inserts may be made integral with the punch.

It will be appreciated that when the nose of the punch is forced into the metal billet 28 in the bottom of the die, metal will flow to fill all of the cavities between the die wall, the punch wall and the insert walls and the flow of the metal will be continued until the metal contacts all of the shoulder 25d of the punch. This flow of metal works the crystalline metal structure to form the grain flow lines illustrated in FIGS. 1 and 2 with the grain flow lines in the head area extending flatwise across the entire head and dipping down into the pin bosses and skirt so that all external surfaces both on the inside and the outside of the piston blank are defined by the sides only of the metal grain flow lines except at some local areas in the ring band adjacent the pin bosses as shown in FIG. 2. This results in greater strength in the ring belt area and since this area of a piston does not rub against the cylinder wall these grain flow line ends are not subjected to wear. When the piston ring grooves are cut in the ring bands the flat impact side walls of these grooves will be defined by the sides of the grain flow lines and will better resist piston ring wear.

At the conclusion of the impact forging stroke the plunger is withdrawn from the die cavity and the piston is carried by the punch and stripped therefrom by a stripper plate. If the piston blank should remain in the die, the ejecting bottom wall 29 forces the piston blank out of the die.

In the arrangement shown in FIGS. 8 to 10 the punch inserts to form the piston skirt flats do not extend completely into the die. As best shown in FIG. 9 a cylindrical punch 42 has a reduced diameter nose 43 shaped to form the inside of the piston and terminating in a scalloped shoulder 44 to form the scalloped end of the piston skirt. Diametrically opposed portions of the cylindrical punch 42 have open bottom slots or recesses 45 therein terminating in radial shoulders 46. The insert blocks 47 are seated in these recesses 45 and are bottomed against the shoulders 46. The inserts 47 project beyond the sides of the punch 42 but have leading ends 48 of reduced thickness with cylindrical back faces 48a and flat front faces 48b. A radial shoulder 49 is formed between the main body of the insert and the reduced leading end 48a.

The punch 42 operates in a die 50 with a cylindrical die cavity 51. The upper end of the die 50 has diametrically opposed slots 52 receiving the inserts 47 and these slots 52 terminate at flat bottoms 53 against which the shoulders 49 of the insert can rest at the end of the forging stroke.

The die 50 has an ejector bottom 54 receiving the blank 28 on its upper face 55. The ejector bottom 54 is vertically movable in the die 50 to remove the finished piston blank from the die.

It will be appreciated that the so-called die 50 is actually an insert which is placed in a massive surrounding die carrier to withstand the impact loads.

The inserts 47 are secured to the punch 42 by means of screws 56 extending through countersunk holes 57 and 58 as shown in FIG. 10.

As shown in FIGS. 8 and 9 the nose 43 of the punch 42 is shaped to finish form the inside of the piston blank and to this end has the strut or rib forming recess 59, the pin boss forming recesses 60, the side walls 61 for forming the inner faces of the ring belt or ring band area between the pin bosses and the side walls 62 for forming the tapered inner faces of the skirt portion which extend on opposite sides of the pin bosses. Of course the leading ends 48 of the inserts 49 have the flat inner faces 48b which form the flats for the piston skirt and the shoulder 44 on the punch forms the scalloped end of the skirt.

The apparatus of FIGS. 8 to 10 forms the same piston blank configuration that is illustrated in FIGS. 1 to 4 and the impact forging operation is the same. The impact load on the punch head may be of the order of 40 to 50 tons per sq. in. and the punch preferably travels at about 120 feet per minute.

In the arrangement of FIGS. 11 to 13, the inserts for forming the piston skirt flats are mounted on a stripper plate instead of the punch. As shown, a punch holder 70 carries a punch 71, with a nose portion 72 forming the inside of the piston 11 and with a shoulder 73 forming the scalloped end of the piston skirt. The punch nose operates in a die insert 74 in a die retainer 75 and on a die ejector bottom 76. A stripper plate 77 receives the punch nose 71 therethrough and follows the punch on guide posts 78 up to stops 79 which limit the retraction of the plate and permit the nose to be pulled through the central aperture 80 thereof to strip the piston 11 from the punch nose. As shown in FIG. 13 the aperture 80 has diametrically opposed vertical recesses 81 therein each receiving the back boss 82 of an insert 83. These inserts have flat opposed front faces 84 and rounded backs 85. The bosses 82 lie completely within the recesses 81 but the flat front rounded back portions of the inserts, as shown in FIGS. 11 and 12, depend below the plate into the die to form the flats 16 of the piston 11. The flat faces 84 of the inserts lie in spaced relation from the sides of the punch nose and the rounded backs 85 mate with the wall of the die 74 like the inserts 32 and 47 carried by the punch. To secure the inserts 83 to the plate 77 screws 86 inserted through bores 87 in the sides of the plate 77 are threaded into the bosses 82 and vertical locking dowels 88 are seated in mating keyways 89 and 90 in the plate 77 and bosses 82 respectively. An overlying locking ring 91 seated in a recess 92 in the top face of the plate 77 is held in position around the aperture 80 by screws 93.

The mounting of the flats forming inserts 83 on a stripper plate makes possible the adjustment of the punch 71 in the holder 70 without affecting the depths that the inserts enter the die. Thus head thicknesses of the forged piston can be changed without changing the dimension from the top of the head to the flats.

The piston blank formed by the impact forging operation of this invention is solution heat treated at temperatures of around 940 to 1000° F. for 2 to 4 hours and is then quenched in water and subjected to a precipitation hardening cycle at temperatures between 350 to 450° F. for a period of 6 to 20 hours. After the preciptation hardening treatment the pistons are air cooled to room temperatures.

From the above description it will be understood that this invention now provides, by inexpensive impact forging operations, a finished form piston blank having flat faces at the pin boss areas with improved grain flow line formation giving maximum strength to the materials of the piston. The flat faces of the piston skirt are formed by insert additions to impact forging apparatus which eliminates heretofore necessary cutting and grinding operations. The piston blanks produced by this invention are completely finished formed on their inside surfaces and only need to be machined to cut the ring grooves, the pin boss holes and the thrust faces of the skirt which are usually oval shaped or cam ground.

I claim as my invention:

1. A one piece extruded metal slipper piston adapted for resisting excessive loads in internal combustion engines and the like which comprises, a metal body having an end head with an outer surface, a ring belt wall depending from the periphery of said end head, a cylindrical skirt depending from said ring belt wall, wrist pin bosses depending from said end head inside said ring belt and skirt in diametrically opposed relationship and terminating above the end of the skirt, said skirt having indented flat faces overlying the pin boss areas, radial shoulders connecting the flat faces with the ring belt, metal grain flow lines throughout said body defining the the outer surface of the head, the inner and outer surfaces of the skirt, the flat faces of the skirt, the inner faces of the pin bosses, and the radial shoulders with their sides only, and the end of said skirt being scalloped and extending to a pair of elongated tails 90° from the flat faces.

2. An extruded aluminum slipper piston which comprises a one piece cup-shaped member having an end head, a thickened cylindrical ring belt depending from the periphery of said end head, a generally cylindrical skirt depending from the ring belt, diametrically opposite flat portions on said skirt, the end of said skirt being scalloped with elongated diametrically opposite tails midway between the opposite flat faces, thickened wrist pin bosses depending from said head inside said ring belt and skirt at the flattened skirt portion in integral relation with the head, the ring belt and the skirt, and shoulders connecting the upper ends of the flat skirt areas with the periphery of the ring belt, said body having throughout metal grain flow lines extending flatwise across the head, dipping down into the pin bosses and skirt and defining the surfaces of the head, the surfaces of pin bosses, the surfaces of the skirt and the surfaces of the shoulders with their sides only.

3. A piston adapted for use in internal combustion engines comprising a head having a substantially flat outer surface, a ring belt area depending from said piston head, a generally circular skirt extending from said ring belt area and having a scalloped end with at least one elongated tail, at least one flat sidewall formed in said generally circular skirt 90° from said tail, a shoulder extending from one end of said flat sidewall to said ring belt area, and a grain flow line construction in said piston extending across the head and parallel to the outer walls of the circular portion of the skirt and normal to the outer surface of the ring belt area and conforming to the outer surface of the flat sidewall formed in said generally circular skirt, whereby the major tensile stresses will be parallel to the direction of grain flow.

4. A generally cup-shaped piston for use in internal combustion engines comprising, a head having a substantially flat outer surface, a ring belt area depending from said piston head, a generally circular scalloped skirt portion extending from said ring belt area and having diametrically opposed elongated portions, a pair of opposed wrist pin bosses integrally formed in the interior portion of said cup-shaped piston 90° from the elongated skirt portions, a pair of flat sidewall portions formed in said generally circular skirt adjacent said wrist pin bosses, a shoulder extending from one end of each of said flat sidewall portions of said skirt to said ring belt area, and a grain flow line construction in said piston extending across the head and parallel to the outer walls of the circular portions of the skirt and normal to the outer surface of the ring belt area and conforming to the interior and exterior surfaces in the region that includes the wrist pin bosses and flattened skirt areas outboard of the wrist pin bosses.

5. The method of making a piston having a non-circular skirt which comprises, centering a heated billet in a die cavity, impacting a punch against the billet for flowing metal from the billet into spaces surrounding said billet to create a free flowing mass of metal, continuing the impacting of said billet to extrude around the punch a piston having a ring belt area and a skirt, arresting the flow of metal in said skirt against flat sidewall-forming inserts disposed on each side of said punch to form flattened sidewall portions in said skirt and a grain flow line structure which extends across the head of the piston and parallel to the walls of the circular portions of the skirt and normal to the surface of the ring belt area.

6. The method of making a piston having a non-circular skirt which comprises, centering a billet in a die cavity, impacting a punch against the billet for flowing metal from the billet into spaces surrounding the billet to create a free flowing mass of metal, continuing the impacting of said billet to extrude around the punch a piston having a ring belt area and a skirt and opposed wrist pin bosses, arresting the flow of metal in said skirt against die inserts on each side of the punch rigidly mounted adjacent the boss-forming portions of said punch to flatten the skirt portions adjacent said bosses and form a grain flow line structure in said piston which is normal to the surface of said ring belt area and parallel to the walls of the flattened portions of the skirt.

7. The method of making a piston having a non-circular skirt which comprises, centering a heated billet in a die cavity, impacting a punch with a pair of diametrically opposed flat face punch elements against the billet for flowing metal from the billet into spaces surrounding the billet to create a free flowing mass of metal, continuing the impacting of said billet to extrude around the punch a piston having a ring belt area and a skirt and opposed wrist pin bosses, arresting the flow of metal in said skirt with said pair of punch elements positioned adjacent the boss-forming portions to flatten the skirt portions adjacent said bosses and for a grain flow line structure in said piston which is normal to the outer surface of the ring belt area and which conforms to the interior and exterior surfaces of the skirt.

8. The method of making a piston having a non-circular skirt which comprises, centering a heated billet in a die cavity, projecting a punch through a stripper, impacting the punch against the billet for flowing metal from the billet into spaces surrounding the billet to create a free flowing mass of metal, continuing the impacting of said billet to extrude around the punch a piston having a ring belt area and a skirt and opposed wrist pin bosses, arresting the flow of diametrically opposed metal in said skirt against a pair of inserts depending from the stripper adjacent the boss-forming portions of said punch and having flat axially extending inner faces to flatten the skirt portions adjacent said bosses and form a grain flow line structure in said piston which is normal to the surface of said ring belt area and parallel to the walls of a flattened portion of said skirt, and limiting the entry of said punch in said die for controlling the position of the active ends of said punch and inserts.

9. Die forging apparatus for forging cup-shaped articles having non-circular skirts and the like comprising: a die having a cavity formed therein, a punch shaped for forging a cup-shaped article mounted for reciprocation in said die, and said punch having flat sidewall forming means in radially spaced relation from the leading end thereof for simultaneously forming a non-circular skirt in the cup-shaped article formed by said punch.

10. Die forging apparatus for forming pistons having non-circular skirts and the like comprising, a die having a cavity formed therein, a punch mounted for reciprocal movement within said die and shaped to form a piston having a skirt and opposed piston pin bosses within said skirt, a pair of punch inserts carried by said punch adjacent the boss-forming portions thereof and depending into radially spaced relation with the leading end of the punch, said insert having opposed inner axially extending faces shaped to flatten the skirt portions of said piston adjacent the bosses, guide shoulders outwardly extending from said punch inserts, and shoulder-receiving slots formed in said die and cooperable with said guide shoulders to control the position of the active end of said punch within said die cavity.

11. Die forging apparatus which comprises a punch having a nose portion shaped to form the interior of a cup-shaped article and diametrically opposite inserts secured to said punch along the sides thereof and overlying a portion of said nose in radially spaced relation from the nose to provide indented portions in the exterior side walls of the cup-shaped article.

12. Die forging apparatus for forging cup-shaped articles having a non-circular skirt and the like comprising: a die having a cavity formed therein, a punch shaped for forming a cup-shaped article mounted for reciprocation in said die, a stripper receiving the punch therethrough, and flat side wall forming elements mounted on said stripper extending therefrom alongside the punch in radially spaced relation from the punch and cooperable therewith for simultaneously forming a non-circular skirt in the exterior side walls of the cup-shaped article formed by said punch.

References Cited by the Examiner

UNITED STATES PATENTS

| 1,425,591 | 8/1922 | Jaques | 78—9 |
| 1,713,231 | 5/1929 | Jack | 92—208 |
| 1,782,236 | 11/1930 | Keller | 25—102 |
| 2,024,285 | 12/1935 | Handler | 29—156.5 |
| 2,041,567 | 5/1936 | Nelson | 92—220 |
| 2,177,574 | 10/1939 | Malina | 92—237 X |
| 2,451,511 | 10/1948 | Rice | 78—18 |
| 2,465,792 | 3/1949 | Davis | 92—208 |
| 2,795,467 | 6/1957 | Colwell | 29—156.5 |
| 2,802,707 | 8/1957 | Day | 92—237 XR |
| 3,009,237 | 11/1961 | Lehmeier. | |
| 3,010,186 | 11/1961 | Townhill | 29—156.5 |
| 3,093,890 | 6/1963 | Sparks | 29—156.5 |

FOREIGN PATENTS

| 661,603 | 3/1929 | France. |
| 224,003 | 10/1942 | Switzerland. |

KARL J. ALBRECHT, *Primary Examiner.*